Patented Aug. 29, 1950

2,520,143

UNITED STATES PATENT OFFICE 2,520,143

ISOLATION OF STIGMASTEROL

Emanuel B. Hershberg, West Orange, N. J., and Abraham Kutner, Columbus, Ohio, assignors to Schering Corporation, Bloomfield, N. J., a corporation of New Jersey No Drawing. Application October 27, 1947, Serial No. 782,464

9 Claims. (Cl. 260—397.2)

This invention relates to the isolation of stigmasterol and its esters from substances containing mixtures of sterols including stigmasterol, such as soy bean sterols.

It has long been known that crystallization alone does not effect a separation of the stigmasterol from other phytosterols in crude soy bean sterols or from their acetyl derivatives. Windaus and Hauth (Ber. 39, 4378 (1906)) were able to effect such a separation by brominating the mixture of sterol acetates and then separating the sparingly soluble stigmasterol acetate tetrabromide. This, however, necessitates a separate treatment in order to recover the stigmasterol which is usually a minor constituent of the mixture, and renders the process long and costly.

We have found that stigmasterol may be recovered as its acetate in a comparatively pure form and in excellent yield by the selective oxidation of the acetylated and brominated phytosterols derived from soy bean oil or from other sources in which stigmasterol occurs in admixture with other sterols. At the same time and by the same process, the sitosterol and other sterols present are converted into useful hormone intermediates, both ketonic and acidic.

We have found that the tetrabromo stigmasterol acetate present after acetylation and bromination with enough bromine to saturate all of the double bonds is quite resistant to oxidation. The acetylated and brominated mixture may be oxidized with chromic acid or other oxidizing agents, as described in U. S. Patents 2,244,968 and 2,323,584, to give dehydroisoandrosterone acetate and other derivatives. By the use of zinc or other debrominating agents, the bromine atoms used for the protection of the double bonds at carbon atoms 5,6- and 22,23- of the stigmasterol acetate are removed simultaneously with those protecting the 5,6- double bond of the derivatives of the other phytosterols originally present.

The stigmasterol acetate may readily be separated from the oxidation products of the other sterols present in the mixture, for example, by extracting the oxidized mixture with a lower aliphatic ether, removing acidic products from the ether by extraction with dilute alkali and evaporating the ether solution while adding a lower aliphatic alcohol. As the ether distills the stigmasterol acetate separates in a crystalline form and may be converted to stigmasterol by saponification with alkali.

The following example is illustrative of the principles of the invention:

A 900 g. portion of soy bean sterols containing stigmasterol is acetylated by refluxing for 2 hours in a solution containing 300 cc. of acetic anhydride, 1000 cc. of acetic acid and 50 g. of potassium acetate. This solution is added while warm to a kettle containing 10 liters of acetic acid, 4 liters of ethylene chloride, and 50 g. of potassium acetate. The sterols are then brominated by the slow addition of a solution of 450 g. of bromine in 1.5 liters of ethylene chloride while at a temperature of 16–17° C.

When all of the bromine has been utilized there is added slowly 1400 cc. of concentrated sulfuric acid (sp. gr. 1.84) and then a solution of 1850 g. of chromic anhydride dissolved in 2400 cc. of water is added over a 2-hour period, keeping the temperature at 19–20° C. After another two hours of stirring, 1.5 liters of water is added and the excess of chromic acid is decomposed by the slow addition of about 300 cc. of methanol.

The mixture is debrominated by stirring it with 900 g. of zinc dust for two hours, after which the batch is diluted with an equal volume of water and extracted with four portions of ether totaling 15 liters. The ether extract is washed repeatedly with water until all of the acetic acid has been removed and then is extracted with alkali to separate the acidic sterol products. The remaining ether solution which now contains only the neutral fractions is concentrated to a volume of about 4 liters, dried over sodium sulfate, and 2 l. of methanol is added in portions as the ether is removed by distillation. As the ether distills, the stigmasterol acetate separates in a crystalline state. When the vapor temperature of the distilling liquid reaches 64° C. the solution which is now thick with solid is chilled to 20° C. and the solid is collected on a filter and washed with methanol. There is obtained about 10% to 15% based on the sterols of stigmasterol acetate M. P. 130–140° C., which after one crystallization from methyl ethyl ketone melts at 140–141° C. Saponification with alcoholic sodium hydroxide solution gives stigmasterol of melting point 170–171° C.

From the methanol mother liquors upon treatment with semicarbazide acetate in the usual fashion, there is obtained about 3% of dehydroisoandrosterone acetate semicarbazone, M. P. 270.5–274° C. (dec.).

The procedural details given in the foregoing example are purely illustrative and the acylation of the hydroxyl, halogenation, oxidation and dehalogenation may be effected by any of the methods known in the art, as described, for example, in U. S. Patents 2,244,968 and 2,323,584. Separation of the stigmasterol ester from the non-acidic oxidation products of the other sterols is readily effected by the difference in solubility, for example, in lower aliphatic alcohols.

We claim:

1. In a method of isolating stigmasterol from mixtures thereof with other sterols the steps which comprise acylating the hydroxyl groups of the mixed sterols, saturating the double bonds present in the sterols with a halogen, oxidizing the mixture with an oxidizing agent capable of oxidizing the unhalogenated sterol side chain, dehalogenating the oxidation product and separating the acid ester of stigmasterol from the dehalogenated mixture.

2. In a method of isolating stigmasterol from mixtures thereof with other sterols the steps which comprise acylating the hydroxyl groups of the mixed sterols, saturating the double bonds present in the sterols with a halogen, oxidizing the mixture with chromic acid, dehalogenating the oxidation product and separating the acid ester of stigmasterol from the dehalogenated mixture.

3. In a method of isolating stigmasterol from mixtures thereof with other sterols the steps which comprise acetylating the hydroxyl groups of the mixed sterols, saturating the double bonds present in the sterols with bromine, oxidizing the mixture with chromic acid, debrominating the oxidation product and separating stigmasterol acetate from the debrominated mixture.

4. In a method of isolating stigmasterol from mixtures thereof with other sterols the steps which comprise acetylating the hydroxyl groups of the mixed sterols, saturating the double bonds present in the sterols with bromine, oxidizing the mixture with chromic acid in the presence of sulfuric acid, debrominating the oxidation product and separating stigmasterol acetate from the debrominated mixture.

5. In the separation of stigmasterol from mixtures thereof with other sterols, the steps comprising acetylating the hydroxyl groups of the mixed sterols, saturating the double bonds present in the sterols with bromine, and oxidizing the mixture with chromic acid.

6. In the separation of stigmasterol from mixtures thereof with other sterols the step which comprises oxidizing with chromic acid an acylated, halogenated mixture of sterols including stigmasterol.

7. In the separation of stigmasterol from mixtures thereof with other sterols the step which comprises oxidizing with chromic acid an acetylated, brominated mixture of sterols including stigmasterol.

8. A method of separating stigmasterol from mixtures thereof with other sterols which comprises acylating the hydroxyl groups of the mixed sterols, saturating the double bonds present in the sterols with a halogen, oxidizing the mixture with chromic acid, dehalogenating the oxidation product, extracting the dehalogenated mixture with a lower aliphatic ether, extracting the ether solution with an aqueous alkali, distilling the ether and adding a lower aliphatic alcohol, separating the relatively insoluble stigmasterol ester from the alcohol solution, and hydrolizing the stigmasterol ester.

9. A method of separating stigmasterol from mixtures thereof with other sterols which comprises acetylating the hydroxyl groups of the mixed sterols, saturating the double bonds present in the sterols with bromine, oxidizing the mixture with chromic acid, debrominating the oxidation product, extracting the dehalogenated mixture with a lower aliphatic ether, extracting the ether solution with an aqueous alkali, distilling the ether and adding a lower aliphatic alcohol, separating the relatively insoluble stigmasterol acetate from the alcohol solution, and hydrolizing the stigmasterol acetate.

EMANUEL B. HERSHBERG.
ABRAHAM KUTNER.

REFERENCES CITED

The following references are of record in the file of this patent:

UNITED STATES PATENTS

| Number | Name | Date |
|---|---|---|
| 2,244,968 | Schwenk | June 10, 1941 |
| 2,323,584 | Schoeller | July 6, 1943 |

OTHER REFERENCES

Windaus: Zeit. Physiol. Chem., 140, 47–51 (1924).

Borstedt: Zeit. Physiol. Chem., 176, pp. 269–281 (1928).